(12) United States Patent  
Poremba

(10) Patent No.: US 9,008,612 B2  
(45) Date of Patent: Apr. 14, 2015

(54) INGRESS/EGRESS CALL MODULE

(71) Applicant: TeleCommunication Systems, Inc., Annapolis, MD (US)

(72) Inventor: Todd Poremba, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/306,691

(22) Filed: Jun. 17, 2014

(65) Prior Publication Data

US 2014/0295788 A1 Oct. 2, 2014

Related U.S. Application Data

(63) Continuation of application No. 12/453,263, filed on May 5, 2009.

(60) Provisional application No. 61/129,006, filed on May 30, 2008, provisional application No. 61/071,547, filed on May 5, 2008.

(51) Int. Cl.
*H04M 11/00* (2006.01)
*H04M 3/36* (2006.01)
*H04L 12/58* (2006.01)
*H04M 3/51* (2006.01)
*H04L 29/06* (2006.01)

(52) U.S. Cl.
CPC .............. *H04M 3/367* (2013.01); *H04L 12/585* (2013.01); *H04L 12/5855* (2013.01); *H04L 51/12* (2013.01); *H04L 51/14* (2013.01); *H04M 3/5116* (2013.01); *H04L 65/80* (2013.01); *H04L 65/1069* (2013.01)

(58) Field of Classification Search
USPC ........................................................ 455/405
See application file for complete search history.

(56) References Cited

U.S. PATENT DOCUMENTS 6,134,316 A 10/2000 Kallioniemi
6,330,313 B1 * 12/2001 Hunt ............................. 379/133
6,526,026 B1 2/2003 Menon (Continued)

FOREIGN PATENT DOCUMENTS

WO WO2006/071271 7/2006

OTHER PUBLICATIONS

International Search Report issued in PCT/US2009/02752, dated Aug. 16, 2010.

(Continued)

*Primary Examiner* — Charles Appiah
*Assistant Examiner* — Randy Peaches
(74) *Attorney, Agent, or Firm* — William H. Bollman

(57) ABSTRACT

A system monitors calls for a service provider. A number of simultaneous communications of a given technology type is monitored for either inbound communications and/or outbound communications associated with at least one service provider. A determination is made if the number of simultaneous communications from the service provider is in excess of a adjustable but set number of simultaneous communications of a given technology type that are permissible. A predetermined action is taken if the number of simultaneous calls or text messages (e.g., SMS, IM, email) is in excess of the set limit, e.g., the call may be terminated or other action taken. Both voice communications and/or non-voice communications (such as SMS, IM, Email, or MMS) can be monitored and throttled.

11 Claims, 7 Drawing Sheets

(56) References Cited

U.S. PATENT DOCUMENTS

| | | |
|---|---|---|
| 6,795,444 B1 | 9/2004 | Vo |
| 6,898,274 B1 | 5/2005 | Galt |
| 7,436,769 B2 * | 10/2008 | Loader et al. ............ 370/235 |
| 2005/0083923 A1 | 4/2005 | Kimata |
| 2005/0148351 A1 * | 7/2005 | Reding et al. ............ 455/466 |
| 2005/0271051 A1 * | 12/2005 | Holloway et al. ............ 370/389 |
| 2007/0003024 A1 | 1/2007 | Olivier |
| 2007/0070980 A1 | 3/2007 | Phelps |
| 2007/0206568 A1 | 9/2007 | Silver |
| 2007/0206613 A1 | 9/2007 | Silver |
| 2008/0117859 A1 | 5/2008 | Shahidi |
| 2008/0228926 A1 | 9/2008 | Shiratzky |
| 2008/0253535 A1 | 10/2008 | Sherry |
| 2008/0267172 A1 | 10/2008 | Hines |
| 2008/0273670 A1 | 11/2008 | Dickinson |
| 2009/0094270 A1 | 4/2009 | Alirez |
| 2009/0129396 A1 | 5/2009 | Bakker |
| 2009/0237210 A1 | 9/2009 | Ciesla |
| 2009/0284348 A1 | 11/2009 | Pfeffer |
| 2010/0142386 A1 | 6/2010 | Snapp |
| 2010/0272242 A1 | 10/2010 | Croy |
| 2011/0149953 A1 | 6/2011 | Helgeson |

OTHER PUBLICATIONS

International Search Report issued in PCT/US2009/002752, dated Jul. 6, 2009.

International Search Report in PCT/US/2010/01938 dated Sep. 30, 2010.

* cited by examiner

INGRESS/EGRESS CALL MODULE

This application is a continuation of U.S. application Ser. No. 12/453,263, entitled "INGRESS/EGRESS CALL MODULE", filed on May 5, 2009 to Poremba; which claims priority from U.S. Provisional Application 61/071,547 entitled "INGRESS/EGRESS CALL MODULE", filed May 8, 2008, and U.S. Provisional Application 61/129,006 entitled INGRESS/EGRESS CALL MODULE", filed May 30, 2008, the entireties of which expressly incorporated herein by reference.

BACKGROUND OF THE INVENTION

1. Field of the Invention

This invention relates generally to communications. More particularly, it relates to throttling on ingress to and egress from a central system for voice or text-based communications.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (a TN or "telephone number" that is either an ANI or "Automatic Number Identification" that identifies the caller's phone or the TN is a P-ANI, or "Pseudo Automatic Number Identifier", also referred to as "ESxK", that only identifies the PSAP the call should route to and the company routing the call), and includes the transmission of callback number and location information when 9-1-1 is used. E9-1-1 may be implemented for landline, cellular or VoIP networks. A Public Safety Answering Point (PSAP) is a dispatch office that receives 9-1-1 calls from the public. A PSAP may be a local, fire or police department, an ambulance service or a regional office covering all services. As used herein, the term "PSAP" refers to either a public safety answering point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP.

The current 911 infrastructure is designed to route a live voice call to a local public safety answering point (PSAP). This requires that voice circuits be available. The result of an E911 call is a direct circuit switched voice connection between an emergency service requestor and a suitable responder. 911 is further enhanced with the ability to deliver location over a data channel in parallel to the call. The location data is typically staged in a database that is queried by the PSAP to determine location information.

FIG. 6 shows a conventional landline public safety access point (PSAP) to automatic location identifier (ALI) connection.

In particular, FIG. 7 shows a PSAP 400 connected to one Automatic Location Identifier (ALI) database 401. Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

An ALI is typically owned by a local exchange carrier (LEC) or a PSAP, and may be regional (i.e. connected to many PSAPs) or standalone (i.e. connected to only one PSAP).

FIG. 7 shows a context diagram for a conventional non-landline positioning center (e.g., an Internet based Voice over Internet Protocol (VoIP) positioning center).

In particular, the ALI database 401 includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400 query the ALI 401 for location information. However, the ALI 401 is not pre-provisioned with location data for non-landline calls (e.g. cellular, VoIP etc) and must communicate with other network entities to obtain and deliver location data to the PSAP 400.

911 calls require voice circuits to be available to complete the voice call to a PSAP. For the most part, PSAPs are capable of receiving only voice calls. Connectivity with a PSAP, established either through the existing time division multiplexed (TDM)-based emergency services network (ESN), or directly over the public switched telephone network (PSTN) to the PSAP, is managed through dedicated telephone switches that cannot be directly dialed.

The present inventors have appreciated that during times of regional crises, such as during a hurricane, the local wireless infrastructure can become overloaded by call volume. This was experienced during the Sep. 11, 2001, terrorist attacks during which voice telecommunications along the east coast was subjected to service failures.

Existing technology uses a limit on the number of voice circuits or network bandwidth available for voice calls or other calls based on other technologies. Existing technology is not dynamic and cannot be controlled from a central access point to a system. Moreover, existing technology cannot deliver location information at the time of call set up and cannot take advantage of the diversity, redundancy, and resiliency of IP networks.

SUMMARY OF THE INVENTION

In accordance with the principles of the present invention, a method of monitoring a state for calls for a service provider comprises monitoring, from a central call routing system, a number of communications for at least one of inbound communications and outbound communications associated with at least one service provider. A determination is made from a state machine if the number of communications from the at least one service provider is in excess of a predetermined number of communications that are permissible. The state machine performs a predetermined action if the number of calls associated with the at least one service provider is in excess of the predetermined number of communications.

In accordance with another aspect of the invention, a system for throttling calls and data messaging being handled by a given service provider comprises a central call routing system to monitor a number of simultaneous communications of a given technology type associated with a given service provider. A state machine dynamically determines a number of simultaneous communications associated with the given service provider, and initiates a predetermined action against any simultaneous communication in excess of a predetermined limited number of simultaneous communications.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
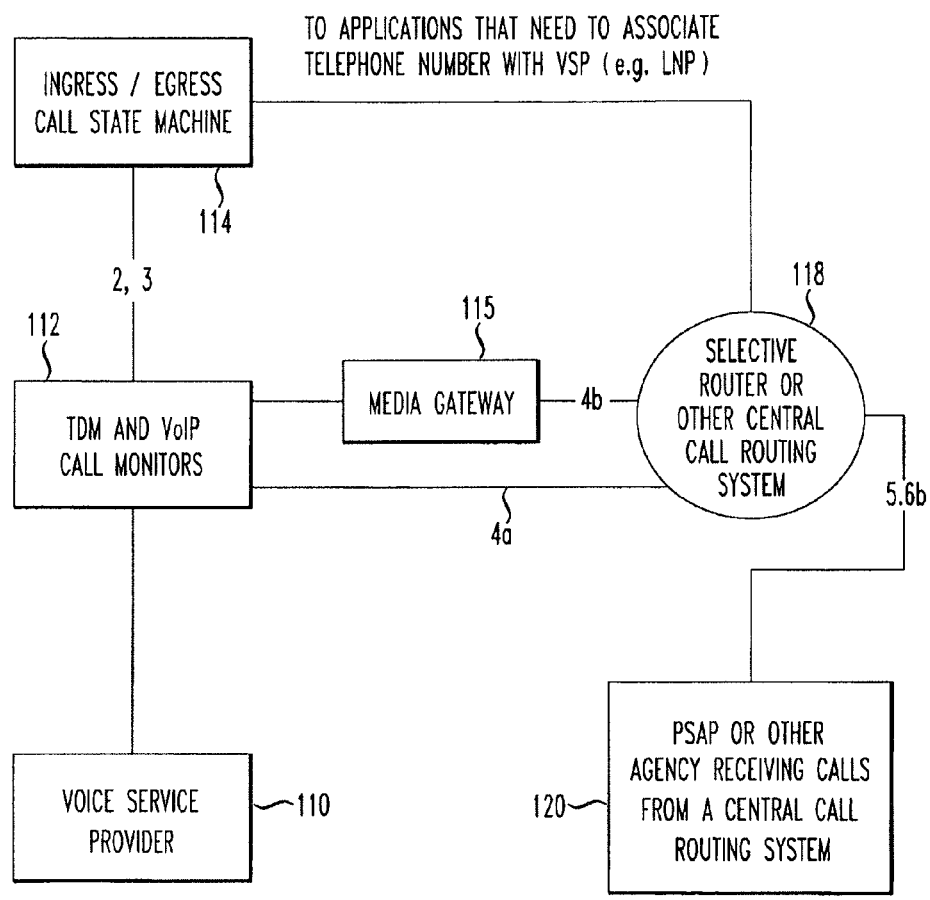
FIG. 1 depicts exemplary message flows for an exemplary communications system, in accordance with the principles of the present invention.

The present invention prevents any one voice service provider or one communication technology from monopolizing a central system's resources.

In accordance with the principles disclosed herein, a module keeps state for all voice calls or non-voice-based requests (SMS, IM, Email) inbound to a central system and outbound from a central system. Any request attempt (ingress) from a service provider in excess of their voice, SMS, IM, or Email allowance are immediately terminated or some other default or chosen action. Additionally or alternately, any request, regardless of originating service provider, in excess of a set limit for a given communication technology (e.g. only 5 concurrent SMS requests are allowed to the central system), are immediately terminated or some other default or chosen action.

Similarly or alternatively, preferably any request that would result in an excess of the allowed number of attempted completions (egress) regardless of service provider or technology is immediately terminated or some other default or chosen action.

The present invention provides benefits to multiple voice service providers (VSP) such that they can use the same circuit(s) as long as the monitoring device and/or IECSM can determine which VSPs calls are which. Moreover, local number portability is no longer an issue because the IECSM can inform systems downstream which carrier is using a specific TN for the current active call.

The invention allows multiple VSPs to use the same circuits or trunks. Moreover, it provides a solution that does not require the locking and unlocking of ported telephone numbers (LNP).

The present invention has applicability with virtually any voice service provider that operates a central call routing system. In accordance with the invention, the central call routing system throttles calls, SMSs, emails, IMs, etc. based on both incoming calls and data messages from other VSPs as well as outgoing calls and data messages to the agency/service that the relevant central call routing system serves.

The present invention provides a Next Generation 9-1-1 messaging center that allows a selective router to receive TDM calls and make routing decision for those calls. The Next Generation 9-1-1 messaging center disclosed herein comprises a media gateway, a back-to-back user agent (B2BUA) that allows SIP body rewrites, and software that integrates with the B2BUS and allows it to query various databases.

The Next Generation 9-1-1 messaging center disclosed herein converts a time division multiplex (TDM) call to voice over Internet protocol (VoIP), and inserts the appropriate location information into the SIP Invite body in the form of PIDF-LO as recommended by NENA i3 standards. The Next Generation 9-1-1 messaging center brings voice, video, and text from any originating device to Internet Protocol (IP) capable PSAPs.

The Next Generation 9-1-1 messaging center also intercepts selective transfer requests from Internet Protocol (IP) public service access points (PSAPs) and determines if the responder to receive that transfer is IP capable or TDM capable. If the responder is IP capable, the Next Generation 9-1-1 Messaging Center forwards the call over the IP network. If the responder is TDM capable, the Next Generation 9-1-1 messaging center determines the dialing pattern necessary for the selective router and sends calls to the selective router for completion.

The Next Generation 9-1-1 infrastructure disclosed herein replaces or augments selective routers and automatic location identification (ALI) databases. The Next Generation 9-1-1 systems disclosed herein eliminate the need for MPCs, GMLCs, and VPCs. ALI databases continue to provide traditional data for Local Exchange Carrier (LEC) subscribers. Other customer operated databases may be expanded to provide further personal information.

The invention provides a module that keeps state information for all voice calls inbound to a system and outbound from a system. Any call set up attempt (ingress) from a voice service provider in excess of the relevant allowance is immediately terminated (or other default of chosen action). Similarly, any call attempt that would otherwise result in an excess of the allowed number of attempted completions (egress) would instead be immediately terminated (or other default or chosen action).

Those having particular use of the invention include any voice service provider that operates a central call routing system. The invention provides the ability to throttle calls or data messages based on both incoming calls from other VSPs as well as outgoing calls to the agency/service that the relevant central call routing system serves.

FIG. 1 shows exemplary message flow for an exemplary communications system, in accordance with the principles of the present invention.

In particular, as shown in FIG. 1, various communications are illustrated between an "Ingress/Egress Call State Machine" (IECSM) 114, a central call routing system 112, a voice service provider 110, a media gateway 115, a selective router or other central call routing system (hereafter referred to as a selective router 118), and a PSAP or other agency receiving calls from a central call routing system (hereafter referred to as a receiving agency 120).

In step 1 of FIG. 1, a voice service provider (VSP) 110 initiates a call to the central call routing system 112.

In step 2, monitoring devices (not shown) within the central call routing system 112 detect all calls and report the state to an IECSM 114.

In step 3, an IECSM 114 receives notification of a call attempt from the monitoring devices within the central call routing system 112. For example, if a VSP 110 is allowed, e.g., no more than three simultaneous calls, and the call in question would be the fourth call, the IESCM 114 sends notice to the monitoring device within the central call routing system 112 to perform some desired action, such as to immediately terminate the fourth call. Similarly, for example, if a set limit is that only ten calls are allowed to simultaneously egress the central call routing system 112, and ten calls are already currently active, then on the next (i.e., 11$^{th}$) call attempt from a VSP 110, the IECSM 114 performs some desired action on the call, such as termination, even if the call would be the VSPs 110 only active call.

The IECSM 114 is preferably capable of informing other systems regarding which VSP 110 is using a given telephone number (TN), thus changing most processes involving Local Number Portability.

In step 4, a call attempt is passed to a central call routing system 112.

In step 4a, if the central call routing system 112 is IP-based, the TDM calls must be converted to IP. On the other hand, as depicted in step 4b, if the central call routing system 112 is TDM based, the VoIP calls must be converted to TDM.

In step 5, a receiving agency 120 receives the call.

In step 6a, the VSP 110 terminates the call, or as depicted in step 6b, a receiving agency 120 terminates the call. In either scenario, the IECSM 114 changes the "ingress" state for that VSP 110 as well as changes the "egress" state for the agency 120 receiving calls.

Figure 2:
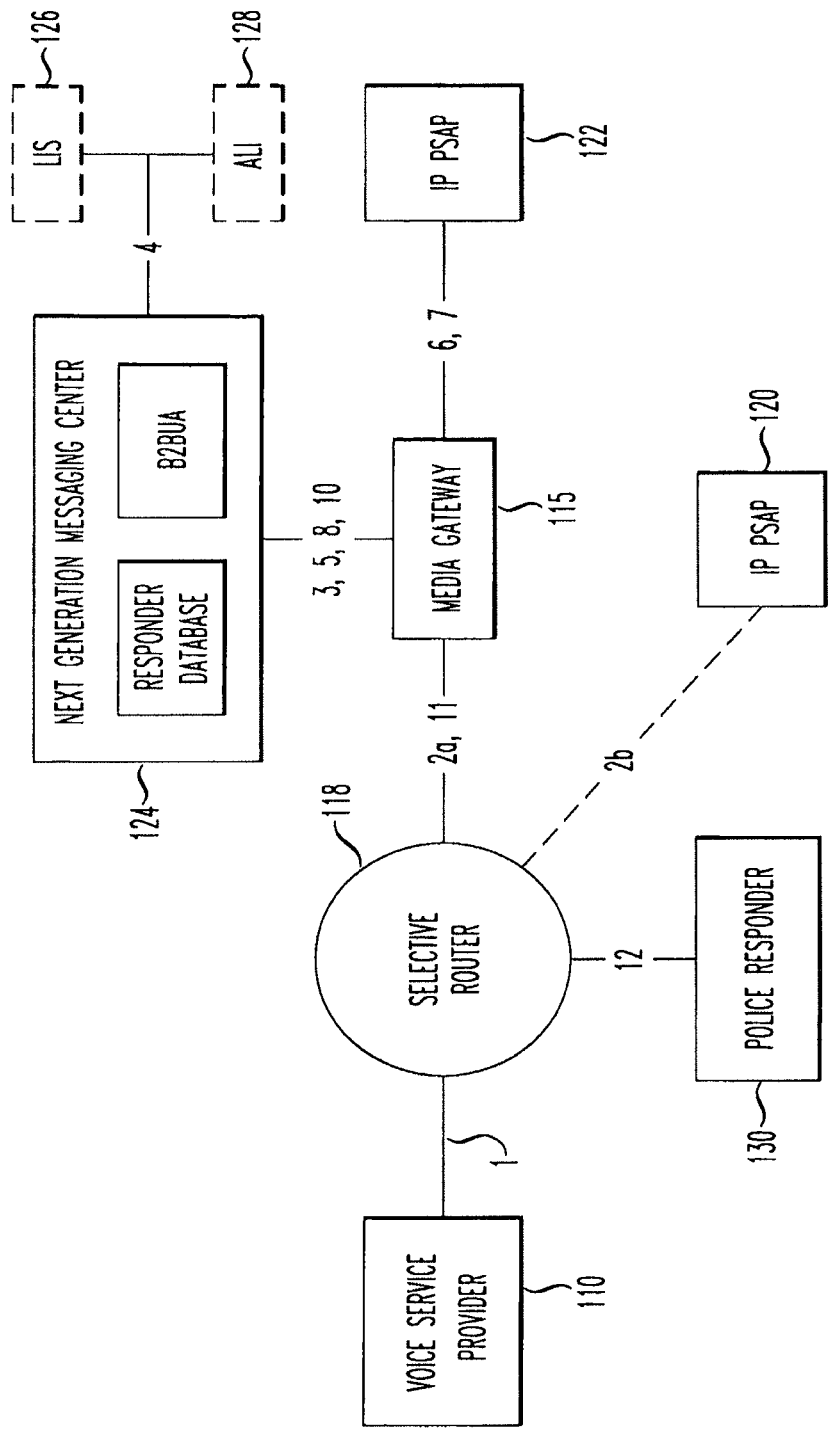
FIG. 2 depicts exemplary message flows for another exemplary communications system, in accordance with the principles of the present invention.

FIG. 2 shows exemplary message flow for another exemplary communications system, in accordance with the principles of the present invention.

In particular, as shown in FIG. 2, various communications are illustrated between a voice service provider 110, a media gateway (Note: In this and other uses, the term media gateway should be considered synonymous with the media gateway and the media gateway controller that may be used in conjunction with it.) 115, a selective router or other central call routing system (hereafter referred to as a selective router 118), and a PSAP or other agency receiving calls from a central call routing system (hereafter referred to as a receiving agency 120), an Internet Protocol (IP) PSAP 122, a police responder 130, a Next Generation Messaging Center (NGMC) 124, a Location Information Server (LIS) 126, and a Automatic Location Identification (ALI) Database 128.

The LIS 126 can be a database service that provides locations of endpoints. In practice, "LIS Steering" may be required to determine which of a possible plurality of LISs to query.

As shown in step 1 of FIG. 2, a Voice Service Provider 110 sends a call out on a 9-1-1 trunk (not shown).

In step 2, the call reaches the selective router 118 and is routed using a telephone number to a trunk group.

In step 2a, a trunk group terminates at a media gateway 115 because the PSAP is now an IP PSAP 122.

In step 2b, a trunk terminates at a TDM based PSAP 120.

In step 3, the media gateway 115 messages the NGMC 124.

In step 4, the NGMC 124 queries either an LIS 126 or ALI 128 (which one is optional but one must be used) using a telephone number to retrieve the location information.

In step 5, the NGMC 124 sends a new message with Presence Information Data Format-Location Object (PIDF-LO) to the media gateway 115. In step 6, the IP PSAP 122 receives location information at the time of call set up.

In step 6a, the call goes to an IP based PSAP, e.g., IP PSAP 122, based on a trunk decision made by the selective router 118.

In step 6b, the call goes to a TDM based PSAP, e.g., TDM PSAP 120, based on a trunk decision made by the selective router 118.

In step 7, the IP PSAP 122 may initiate a selective transfer using, in this case, a SIP Invite to SOS.Police.

In step 8, the media gateway 115 again queries the NGMC 124.

In step 9, the NGMC 124 determines who the responder is and then determines how to reach that responder using a database of responders: e.g., using either another Session Initiation Protocol (SIP) Uniform Resource Identifier (URI), or using a dialing pattern that the selective router can interpret, such as "*1".

In step 10, the NGMC 124 sends what it has determined to the media gateway 115.

In step 11, the media gateway 115 either sends the SIP universal resource indicator (URI) to another IP node, or, as in the example in FIG. 2, will send the dialing pattern to the selective router 118.

In step 12, the selective router 118 interprets the dialing pattern and sends the call out to the trunk group of the appropriate police or other emergency responder 130.

Figure 3:
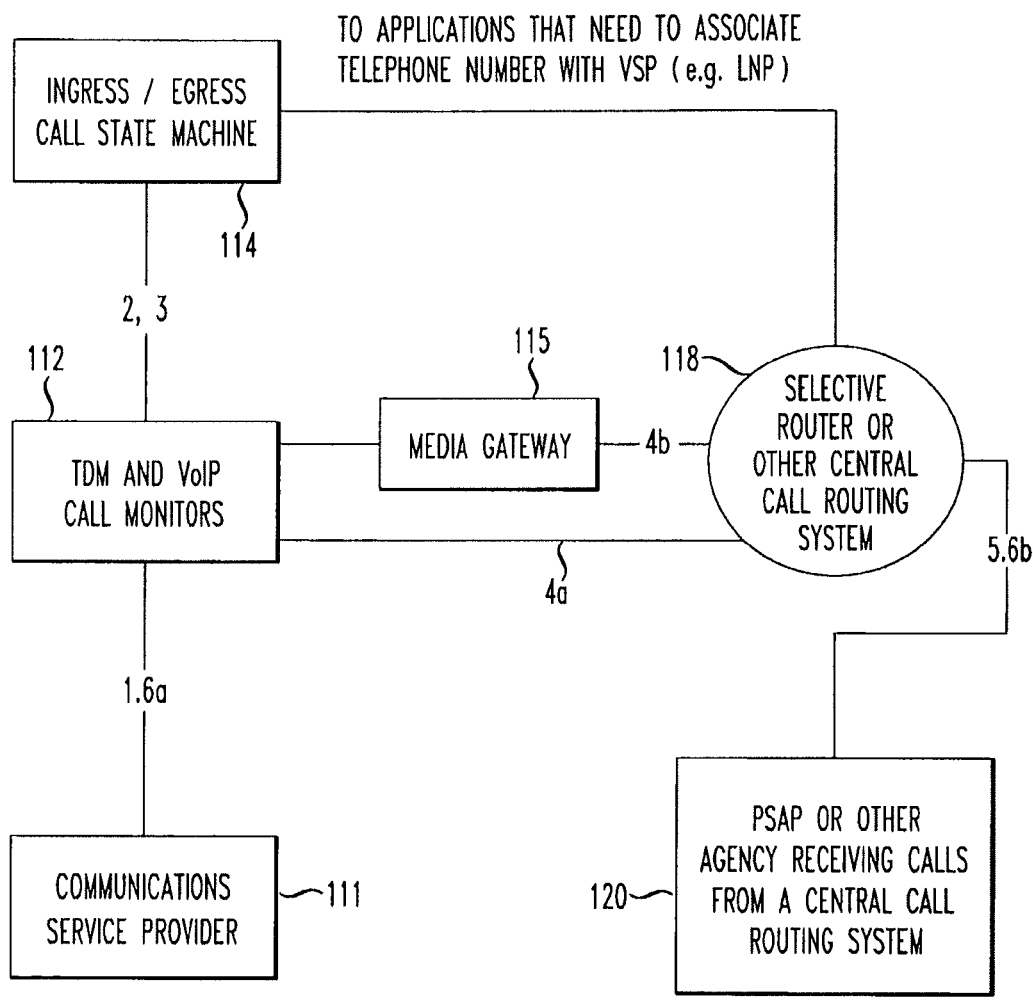
FIG. 3 shows an exemplary ingress/egress system and message flow for another exemplary communications system, in accordance with the principles of the present invention.

FIG. 3 shows an exemplary ingress/egress system and message flow for another exemplary communications system, in accordance with the principles of the present invention.

In particular, as shown in FIG. 3, call flow is illustrated between an IECSM 114, a central call routing system 112, a Communications Service Provider (CSP) 111, a media gateway 115, a selective router or other central call routing system (hereafter referred to as a selective router 118), and a PSAP or other agency receiving calls from a central call routing system (hereafter referred to as a receiving agency 120).

In step 1 of FIG. 3, a CSP 111 initiates a request to the central call routing system 112. It is noted that in the example shown, it is assumed that Short Message Service (SMS), Instant Messaging (IM), Email requests, etc. will use another system to initiate an IP call request. This request may look to the receiving system like another VoIP call request.

In step 2, monitoring devices within the central call routing system 112 detect all requests and report the state to the IECSM 114.

In step 3, an IECSM 114 receives notification of a request from the monitoring devices (not shown) within the central call routing system 112. For example, if a CSP 111 is subject to a set limit of no more than three simultaneous requests, and a given request in question would be the fourth simultaneous request, the IECSM 114 sends notice to the monitoring device within the central call routing system 112 to perform some desired action, such as terminate the call.

Similarly, as another example, if only ten simultaneous requests are allowed to egress the central call routing system 112, and ten requests are currently active, then on the next request from a CSP 111, the IECSM 114 performs some desired action on the call, such as termination, even if the call would be the CSP's 111 only active call.

Additionally, the IECSM 114 can be configured to allow only a given number of requests (e.g., three) originated from a particular technology (e.g., from an SMS system). In this case, upon receipt of a 4$^{th}$ request made over SMS, the IECSM 114 performs some desired action on the request, such as termination.

The IECSM 114 can also inform other systems regarding which CSP 111 is using a given telephone number, thus changing most processes involving Local Number Portability.

In step 4, the request is passed to a central call routing system 112. In step 4a, if the central call routing system 112 is IP-based, the TDM calls must be converted to IP.

In step 4b, if the central call routing system is TDM based, the VoIP calls must be converted to TDM. In the case where the request is not a call (such as SMS, IM, or Email), the request is passed forward by another system as if it were a VoIP call so that services can be provided by the central call routing system 112.

In step 5, an end agency, e.g., PSAP 120, receives the request and performs the appropriate action, i.e., either carries out a voice conversation or provides information to communicate to an SMS, IM, or Email user.

In step 6a, a CSP 111 terminates the call, or as depicted in step 6b, the receiving agency, e.g., PSAP 120, terminates the call. In either scenario, the IECSM 114 changes the "ingress" state for that CSP 111, i.e., changes the "ingress" state for the technology in question, as well as changes the "egress" state for the agency receiving calls.

Figure 4:
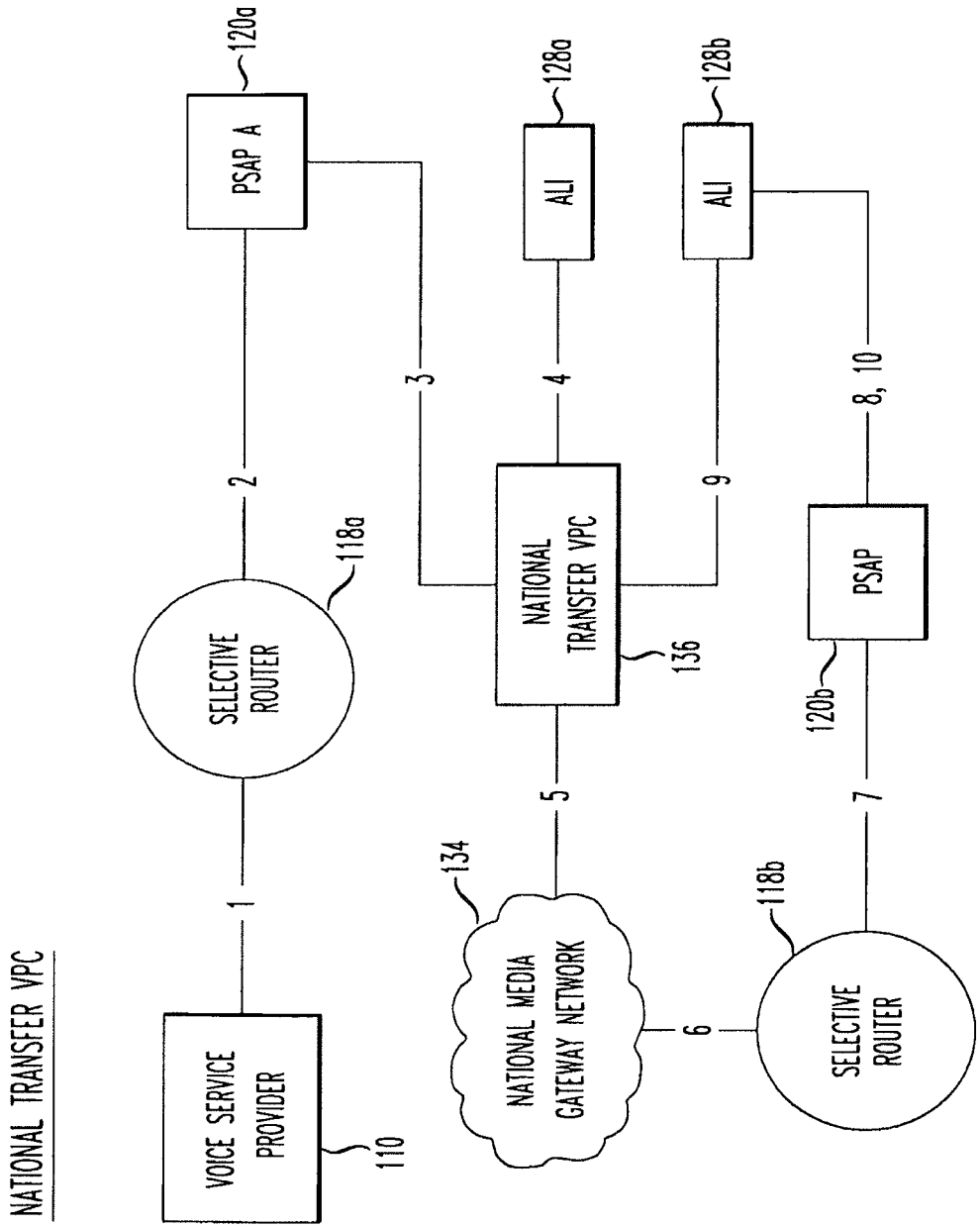
FIG. 4 shows exemplary message flow for yet another exemplary communications system, in accordance with the principles of the present invention.

FIG. 4 shows an exemplary message flow for another exemplary communications system, in accordance with the principles of the present invention.

In particular, as shown in FIG. 4, various communications are illustrated between a Voice Service Provider 110, a selective router or other central call routing system (hereafter referred to as a first selective router 118a and a second selective router 118b), a first selective router 118a, a PSAP or other agency receiving calls from a central call routing system (hereafter referred to as a first receiving agency 120a and a second receiving agency 120b), a first PSAP 132, a national media gateway network 134, a National Transfer VPC 136, a first ALI 128a, and a second ALI 128b.

In step 1 of FIG. 4, the Voice Service Provider 110 sends a call into the local E9-1-1 system.

In step 2, the first selective router 118a sends the call to the first PSAP 120a.

In step 3, the first PSAP 120a determines that the call must be transferred to a PSAP not connected to their selective router, e.g., the second PSAP 120b. The first PSAP 120a dials a 10-digit number that corresponds to an IVR system (not shown) in the National Transfer VPC 136. The IVR system retrieves the call back number and the destination PSAP, e.g., second PSAP 120b, or destination city/state.

In step 4, the National Transfer VPC 136 retrieves location information from the local ALI, e.g., ALI 128a, querying as if it is a PSAP. The National Transfer VPC 136 assigns the call an ESRN and ESQK appropriate to the location provided to the IVR.

In step 5, the call is sent out on the national media gateway network 134.

In step 6, the national media gateway network 134 forwards the call to the second selective router 118b.

In step 7, the second selective router 118b forwards the call to the second PSAP 120b provided to the National Transfer VPC's 136 IVR.

In step 8, the second PSAP 120b queries the local ALI 128b for an ESQK.

In step 9, the national transfer VPC 136 provides the caller's callback number and location information.

In step 10, the local ALI 128b delivers the caller's information.

Figure 5:
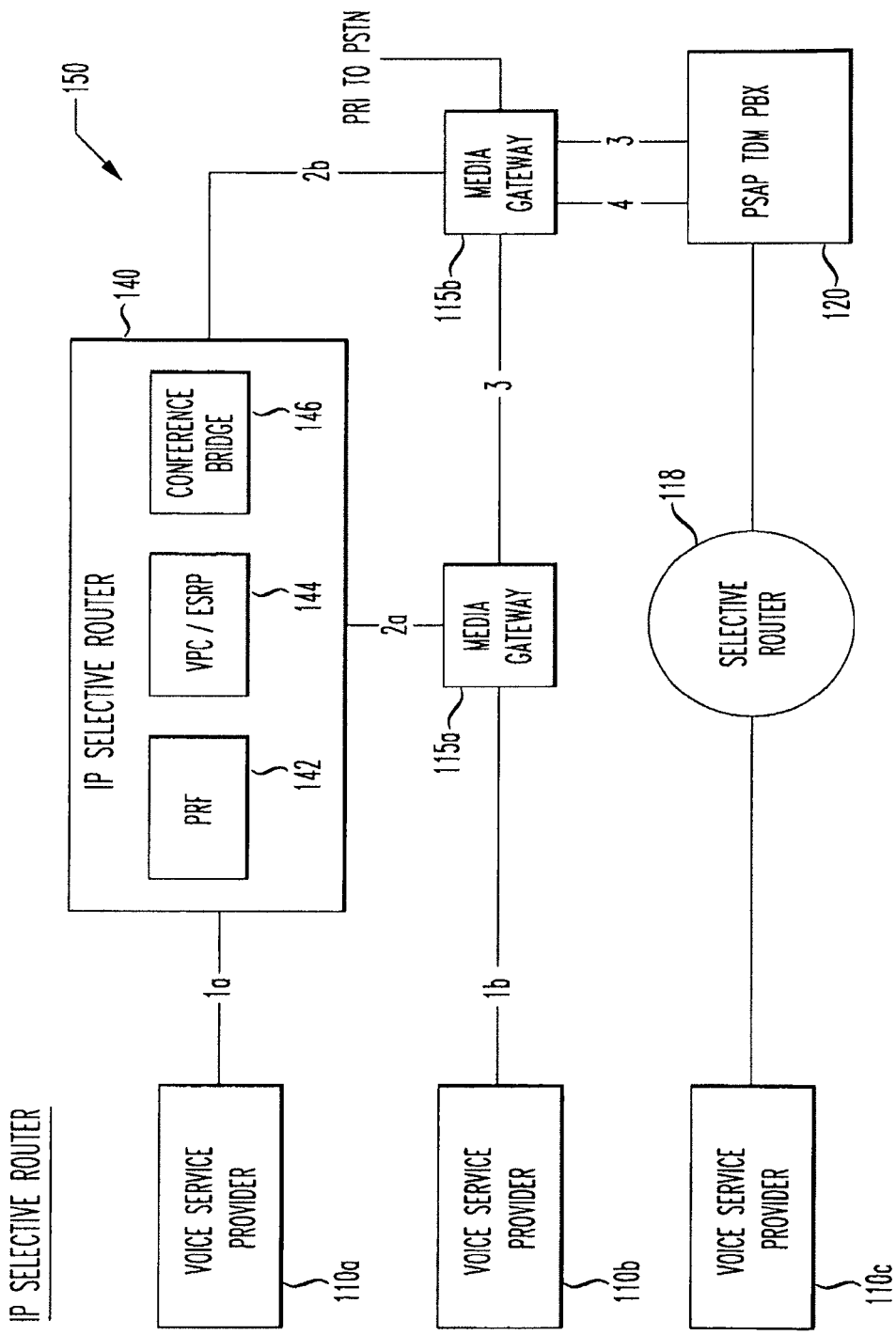
FIG. 5 shows an exemplary message flow for another exemplary communications system, in accordance with the principles of the present invention.
Figure 6:
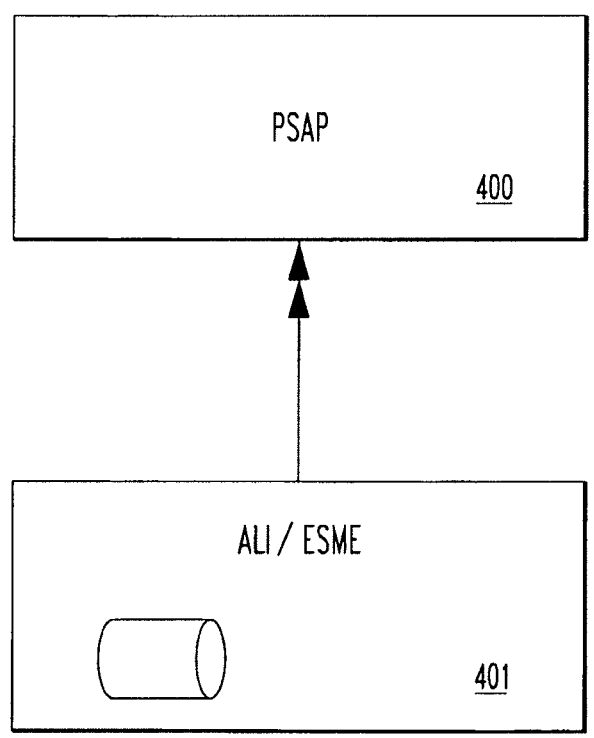
FIG. 6 shows a conventional landline public safety access point (PSAP) to automatic location identifier (ALI) connection.
Figure 7:
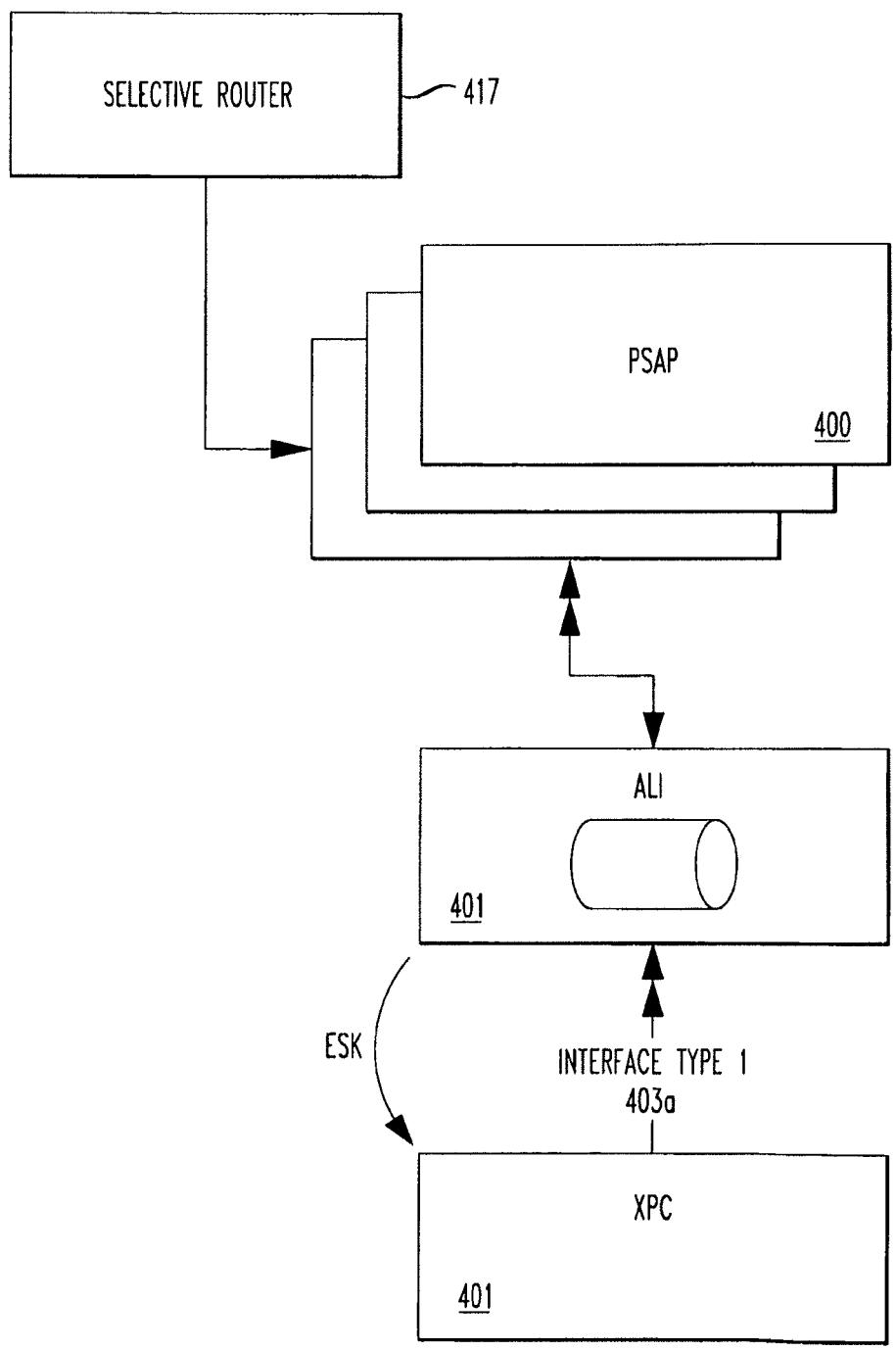
FIG. 7 shows a context diagram for a conventional non-landline positioning center (e.g., an Internet based voice over Internet Protocol (VoIP) positioning center).

FIG. 5 shows an exemplary message flow for another exemplary communications system, in accordance with the principles of the present invention.

In particular, as shown in FIG. 5, various communications are illustrated between a first service provider 110a, a second voice service provider 110b, a third voice service provider 110c, an IP selective router 140, a first media gateway 115a, a second media gateway 115b, a selective router 118, and a PSAP or other agency receiving calls from a central call routing system (hereafter referred to as a receiving agency 120). The IP selective router 140 includes a Policy Routing Function (PRF) 142, a VPC/Emergency Services Routing Proxy (ESRP) 144, and a conference bridge 146.

The ESRP 144 preferably is a SIP proxy server that selects the next hop routing within an ESInet based on location and policy. A "PSAP Proxy" is used in some implementations to facilitate completion of calls to Legacy PSAPs.

The Policy Routing Function (PRF) 142 is preferably an entity that defines attributes such as hours of operation, default routing, and overflow routing.

In step 1a of FIG. 5, all VoIP Service Providers 110a, 110b, and 110c, send calls to the IP Selective Router 140 within the system 150 that provides parallel service to a TDM-based selective router 118.

In step 2b, the IP Selective Router 140 routes a call to a media gateway 115b local to the correct receiving agency 120.

In step 3, the media gateway 115b converts a call back to TDM and passes the call to the receiving agency's 120 TDM-based PBX over local cables, just as if they were trunks from a selective router 118.

The IP Selective Router 140 interprets the receiving agency's 120 equipment signaling for a selective transfer and sets up the call to the responder from the receiving agency's 120 local media gateway 115b using a PRI.

In step 1b, the voice service provider 110b sends calls to the media gateway 115b local to the TDM based selective router 118.

In step 2a, the media gateway 115a local to the TDM based selective router 118 signals to the IP selective router 140.

In step 3, the IP selective router 140 routes the call, through the media gateway 115a local to the TDM selective router 118, and to a media gateway 115 local to the correct receiving agency 120.

In step 4, the media gateway 115b local to the receiving agency 120 converts the call back to TDM and passes the call to the receiving agency's 120 TDM PBX over local cables, just as if they were trunks from a selective router 118.

The IP selective router 140 interprets the receiving agency 120 equipment signaling for a selective transfer and sets up the call to the responder from the receiving agency's 120 local media gateway 115b using a PRI.

One of ordinary skill in the art will appreciate that the present invention can be used with an Emergency Call Routing Function (ECRF) that receives location information (either civic address or geo-coordinates) as input.

The ECRF uses the information to provide a URI that routes an emergency call toward the appropriate PSAP for the caller's location.

One of ordinary skill in the art will appreciate that the present invention can also be used with a Location Validation Function (LVF) that validates location objects against the next generation address data.

Advantageously, the invention may be implemented without the need for immediate PSAP upgrades. It enables transfers from any selective routers disclosed herein to any other selective router disclosed herein with only minor configuration changes. No interoperability issues are presented or additional software loads required.

Implementation of the IP selective router disclosed herein provides for a slow migration to IP call routing while at the same time extends the life of existing selective routers. The invention allows for dynamic addition of call answering stations at a PSAP by simple activation of additional DS0s from the local media gateway into a PBX. It establishes a diverse, redundant IP network for use by voice service providers to PSAPs. Additional services will also be able to make use of the networks disclosed herein.

The Next Generation Messaging Center disclosed herein makes selective routers and ALI databases next generation capable. The Next Generation Messaging Center disclosed herein establishes a diverse, redundant IP network for use by voice service providers to PSAPs. Additional services are able to utilize this network. The invention affects only PSAPs migrating to IP, with no disruption to other E9-1-1 customers.

While the invention has been described with reference to the exemplary embodiments thereof, those skilled in the art will be able to make various modifications to the described embodiments of the invention without departing from the true spirit and scope of the invention.

What is claimed is:

1. A method to throttle communication sessions, comprising:
    predetermining a fixed number of simultaneous communication sessions initiated from each of a plurality of service providers;
    receiving a report, from a call routing system that controls routing to a given agency capable of receiving a fixed number of simultaneous communications, for each communication ingress to said call routing system; and
    immediately causing termination of a latest communication session to ingress said call routing system when a service provider initiating said latest communication session is associated with a number of simultaneous communication sessions in excess of said predetermined fixed number;
    wherein any given service provider requesting ingress to said call routing system is not permitted to monopolize resources associated with said given agency.

2. A method to throttle communication sessions according to claim 1, wherein:
    said communication sessions are of a common type communication.

3. A method to throttle communication sessions according to claim 2, wherein:
    said common type communication is a text message.

4. A method to throttle communication sessions according to claim 2, wherein:
    said text message is a short message system (SMS) message.

5. A method to throttle communication sessions according to claim 2, wherein:
    said common type communication is a Voice over Internet Protocol (VoIP) call.

6. A method to throttle communication sessions according to claim 2, wherein:
    said fixed number of simultaneous communication sessions varies for at least some of said plurality of service providers.

7. A method to throttle communication sessions according to claim 2, wherein:
    said given agency is a public safety answering point (PSAP).

8. A system for throttling calls to a public safety answering point (PSAP), comprising:
    a central call routing system to route calls to a given agency;
    an ingress/egress call throttle machine; and
    a call monitor server between said central call routing system and said ingress/egress call throttle machine;
    wherein said call monitor server provides an ingress report to said ingress/egress call throttle machine for each call ingress to said central call routing system, said report including a service provider associated with said each call ingress;
    wherein said call monitor server further provides an egress report to said ingress/egress call throttle machine for each call egress from said central call routing system, said report including a service provider associated with said each call egress; and
    wherein said ingress/egress call throttle machine causes termination of any call ingressing said central call routing system that exceeds a predetermined number of simultaneous active calls in said central call routing system, allotted to a given service provider.

9. A system for throttling calls to a public safety answering point (PSAP) according to claim 8, wherein:
    said common type communication is a Voice over Internet Protocol (VoIP) call.

10. A system for throttling calls to a public safety answering point (PSAP) according to claim 8, wherein:
    said fixed number of simultaneous communication sessions varies for at least some of said plurality of service providers.

11. A system for throttling calls to a public safety answering point (PSAP) according to claim 8, wherein:
    said given agency is a public safety answering point (PSAP).

* * * * *